Feb. 28, 1967  W. E. ROOD, JR  3,305,898

COTTON RECLAIMING APPARATUS

Filed Sept. 20, 1965  2 Sheets-Sheet 1

INVENTOR.
WILLIAM E. ROOD, JR.
BY
ATTORNEYS

Feb. 28, 1967  W. E. ROOD, JR  3,305,898
COTTON RECLAIMING APPARATUS
Filed Sept. 20, 1965  2 Sheets-Sheet 2

INVENTOR.
WILLIAM E. ROOD, JR.
BY
ATTORNEYS

United States Patent Office 3,305,898
Patented Feb. 28, 1967

3,305,898
COTTON RECLAIMING APPARATUS
William E. Rood, Jr., 1500 S. 7th St.,
Phoenix, Ariz. 85007
Filed Sept. 20, 1965, Ser. No. 488,594
6 Claims. (Cl. 19—203)

My invention relates to an improved cotton reclaiming apparatus, and more particularly to an improved cotton reclaiming apparatus employing a doffer and belt combination to reclaim cotton ordinarily discarded from a cotton cleaning apparatus.

When mechanical means are employed to harvest cotton, a substantial quantity of cotton is missed by the mechanical cotton pickers and knocked to the ground. This cotton which has been knocked to the ground is generally referred to as "down" cotton. Numerous methods and apparatus have been suggested for the cleaning of down cotton with varying degrees of success and applicability. A particularly successful cotton cleaning apparatus is described in United States Patent No. 2,670,584.

Cotton that has been retrieved from the ground will usually be relatively dirty; that is, the cotton will have trash adhering to it such as twigs, sticks, grass, etc. In order for the cotton cleaned from the field to be of use, it first must be cleaned to remove trash. In the cotton cleaning process, trash is separated from the cotton by various means. Even in the most highly efficient cotton cleaning apparatus, a small percentage of cotton is usually lost in the cleaning process. Usually, the lost cotton is mixed with and discarded with the trash removed from the down cotton by the cotton cleaning apparatus. Although the relative percentage of cotton discarded is usually small, its actual volume is high when one considers the enormous quantities of cotton which are cleaned. Thus, reclamation of cotton ordinarily lost in the cleaning process is of significant economic importance to those depending on the industry for a livelihood.

It is therefore a principal object of my invention to provide an apparatus for the reclaiming of cotton from the trash discard of cotton cleaning apparatus.

It is another object of my invention to provide an apparatus which is highly selective between trash and cotton so as to perform a dual objective of both reclaiming and at least partially cleaning cotton normally discarded by cotton cleaners.

Other objects and advantages of my invention will become apparent to those skilled in the art in the course of the following specification and claims when taken in view of the accompanying drawings.

Briefly, my cotton reclaiming apparatus comprises a rotating doffer positioned proximate to a rotary cleaner saw carrying cotton and trash in a downward direction. The doffer rotates in the same direction as the saw so that at their points of mutual proximity, their peripheral motions are in opposite directions. The doffer knocks cotton and trash from the teeth of the saw and into a reclaiming zone where the cotton is grasped by a slotted belt of the type described in U.S. Patent No. 2,670,584. Trash, being heavier and more dense than cotton, is knocked in a more horizontal direction away from the saw and is thus substantially freed from the cotton which travels in an upward direction. Positioning of the slotted belts is such that cotton is brought into contact therewith just as the slots are beginning to close in the reclaiming zone after the belt travels about the lowermost mounting pulley. Cotton is thus grasped by the belt and carried to an appropriate receptacle or other conveying means while the trash is simply discarded. Usually, reclaimed cotton is reintroduced as part of the feed to the cotton cleaning apparatus from which it is reclaimed, but the selectivity of my apparatus is such that this may not always be necessary.

A better understanding of my invention may be obtained in light of the accompanying drawings which are set forth for illustrative purposes and are not to be construed to limit my invention. In the drawings.

Figure 1:
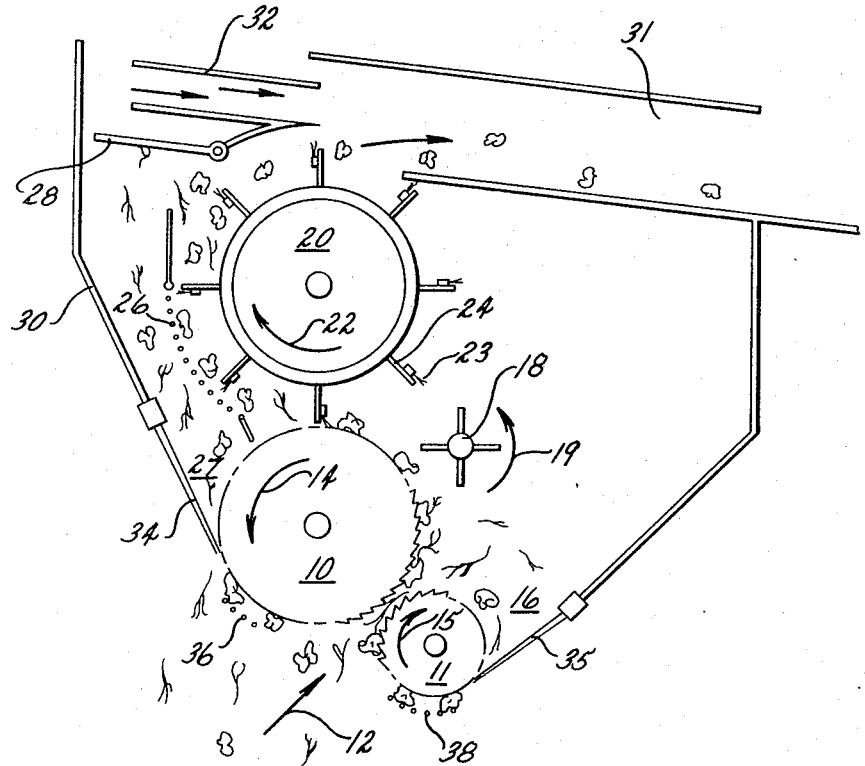
FIGURE 1 is an illustration of a cotton cleaner and is set forth as a non-limiting illustration of a cotton cleaner with which the cotton reclaiming apparatus of the present invention is useful.

With reference to the drawings, the cotton cleaning apparatus illustrated in FIGURE 1 is highly efficient when compared with previously known apparatus. A pair of cleaner saws 10 and 11 rotate in opposite directions with the larger saw 10 having a peripheral velocity greater than that of the smaller saw 11. Cotton to be cleaned is fed between the saws 10 and 11 as indicated by the arrow 12. The saws 10 and 11 rotate in opposite directions as indicated by the arrows 14 and 15 so that their peripheral motion at their point of closest proximity is in the direction of the arrow 12. Because the larger saw 10 has a greater peripheral velocity than the smaller saw 11, cotton is stripped from the smaller saw and carried upwardly in an arcuate path by the larger saw. Trash mixed with the cotton feed tends to travel in a straight line and is only loosely held, if at all, by the teeth of either saw. The trash travelling in a straight line between the saws tends to be thrown into a reclaiming space 16, and is impelled downwardly by contact with the outer or downwardly moving portion of the small saw 11. A paddle-like doffer 18 rotates in the same direction as the larger saw 10 as indicated by the arrow 19. The doffer 18 is positioned slightly out of contact with the large saw 10 so as to strike trash protruding from the cotton carried thereby. In this manner, trash adhering to the cotton carried by the saw 10 is knocked into the reclaiming space 16 associated with the smaller saw 11. This action of the doffer 18 further cleans trash from the cotton carried by the large saw 10. A large doffer is positioned above the large saw 10 and rotates in an opposite direction as indicated by the arrow 22 and at a peripheral velocity greater than the peripheral velocity of the large saw 10. Brushes 23 secured to arms 24 extending from the doffer 20 contact the saw 10 and the cotton carried thereby. The effect of the doffer 20 is to brush or wipe cotton from the saw 10 and carry the cotton upwardly. As the cotton removed from the large saw 10 is carried upwardly by the large doffer 20, a plurality of grid bars 26 hold the cotton in contact with the doffer 20 and tend to vibrate the cotton during its passage. Some the trash remaining in the cotton at this point is loosened therefrom and passes through the grid bars 26 into the reclaiming space 27 generally associated with the large saw 10. A small amount of cotton may also pass through the grid bars 26 along with the trash.

Trash remaining in the cotton after passage through the area bounded by the grid bars 26 is thrown upwardly to contact an angle plate 28. Trash, being more resilient than cotton, tends to bounce at an angle away from the doffer 20 and pass downwardly between the grid bars 26 and the outer shell 30 of the cleaner into the reclaiming space 27 associated with the larger saw 10. Cotton, being softer and having less bounce tends to drop back into the influence of the doffer 20 and be further carried thereby. Clean cotton is thrown by the doffer into a conduit 31 for transport by means of an air blast through the air duct 32. Cotton not thrown into the conduit 31 generally enters the reclaiming space 16 associated with the smaller saw 11 for further treatment. Brushes 34 and 35 guide trash and cotton in the reclaiming spaces 27 and 16 associated with the large saw 10 and the small saw 11, respectively. In the reclaiming spaces, cotton is snagged by the saw travelling in a downward direction and is carried past a plurality of grid bars 36 and 38. Trash passes through the brushes 34 and 35 and the cotton is vibrated or buffeted by its contact with the grid bars 36 and 38 to remove further trash which may adhere to the cotton. The cotton carried by the saws 10 and 11 past the grid bars 36 and 38 then forms a part of the feed to the cleaning apparatus as hereinbefore described. In spite of the high efficiency of apparatus such as illustrated in FIGURE 1, some cotton is lost as discard along with the trash, primarily through the brushes and the grid bars in the reclaiming portions of the cotton cleaner. As hereinbefore indicated, although the percentage of cotton thus lost is small, its total volume is intolerably large because of the vast amounts of cotton cleaned by such apparatus.

Figure 2:
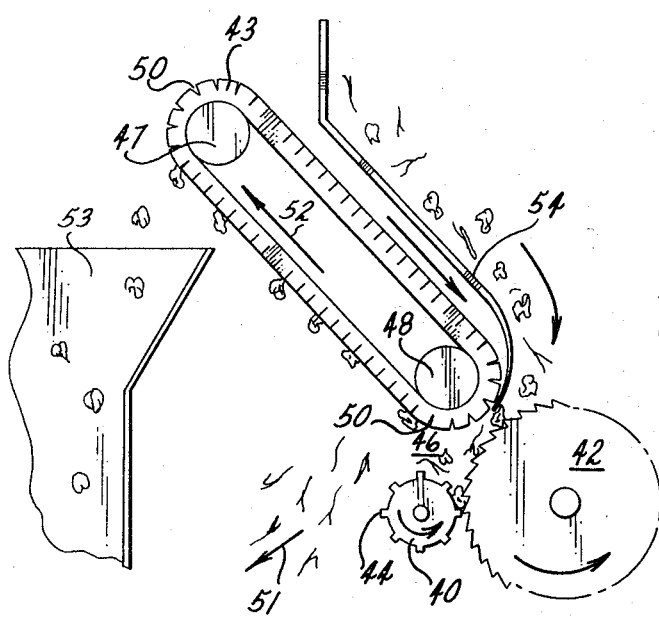
FIGURE 2 is a partial elevational view illustrating my improved reclaiming apparatus and its relative positioning when operated in conjunction with a cotton cleaner of the type illustrated in FIGURE 1.

Referring now to FIGURE 2, I have found that by positioning a doffer 40 proximate to the downward moving portion of the cleaner saw 42 and providing a pickup belt 43, that substantially all the cotton previously lost or discarded in the cleaning operation may be reclaimed. The doffer 40 has an axis of rotation substantially parallel to that of the saw 42 with which it is associated. The doffer 40 rotates in the same direction as the saw 42 with which it is associated so that at their points of closest proximity, the peripheral motions of the saw 42 and the doffer 40 are in opposite directions, the saw 42 having a substantially downward motion and the doffer having a substantially upward motion. Doffer 40 is positioned just barely out of contact with the saw 42 in order to physically knock loose cotton away from the saw 42 in an upward direction. Lugs 44 throw the cotton from the saw 42 as well as some of the trash associated therewith in an upward direction away from the saw 42 and into a reclaiming zone 46. The distance between the doffer 40 and the belt 43 is somewhat exaggerated to facilitate the description thereof.

A slotted belt of the type described in U.S. Patent No. 2,670,584 is positioned just above the doffer to receive cotton thrown thereby. The slotted belt 43 travels around a pair of pulleys 47 and 48, either or both of which may be driven, the lowermost pulley 48 being positioned such that the slots 50 in the belt 43 are closing as cotton is received from the doffer 40 in the reclaiming zone 46. Because the trash is generally heavier and more dense than the cotton, the trash will tend to be thrown away from the saw 42 and out of the reclaiming zone 46 as generally indicated by the arrow 51. Travel of the belt is in the direction indicated by the arrows 52. Cotton grasped by the slots 50 in the belt 43 is carried upwardly by the belt 43 and released as the belt passes over the upper pulley 47 and the slots 50 again open. Cotton released by the belt 43 falls into an appropriate receptacle 53 for further use or treatment as desired. Usually, cotton thus reclaimed is passed through the cleaning apparatus again but this is not always required, depending on the use to which the reclaimed cotton is to be put.

A guide 54 forms the outer shell or cover for the cotton cleaner with which my improved reclaiming apparatus is associated and serves to guide cotton into contact with the saw 42 and to avoid premature contact of the cotton with the slotted belt 43. FIGURE 2 illustrates my cotton reclaiming apparatus substantially as it would appear associated with the larger saw 10 in the cotton cleaning apparatus of FIGURE 1. It is to be understood, of course, that the same principles apply and my apparatus is useful in association with the smaller saw 11 of FIGURE 1. Preferably, my cotton reclaiming apparatus is employed in association with both the larger and the smaller of the saws in a cotton cleaning apparatus such as illustrated in FIGURE 1.

As a further advantage of my invention, it may be observed that cotton which is not thrown from the saw 42 by the doffer 40 is forced into a secure position on the teeth of the saw. In this manner, cotton not thrown by the doffer 40 is prevented from inadvertently being lost and will be carried by the saw 42 into the cleaning apparatus without loss. Thus, even if my apparatus is operated at less than one hundred percent doffer efficiency, loss of cotton in the cleaning process is substantially obviated with all cotton being either reclaimed or reintroduced to the cleaning cycle.

Doffers employed in association with the cleaning saw and slotted belt in accordance with my invention may be of any desired configuration which will accomplish their intended purpose which is to knock cotton from the saw into a reclaiming zone. I prefer, however, that the doffers employed in accordance with my invention have the general configuration of the special doffer illustrated in particular detail in FIGURES 3 and 4. The doffer, generally designated by the reference character 55, rotates about an axle 56 which may be driven by any desired means. A cylindrical body portion 58 is secured to the axle 56 and rotates therewith. Preferably, the body portion 58 is formed of a resiliently deformable material such as a heavy-duty rubber sponge or the like. The body portion 58 forms a major portion, preferably at least seventy-five percent, of the total diameter of the doffer 55 and is surrounded by a substantially impervious outer skin 59. The outer skin 59 is of a material which is flexibly deformable to conform to the shape of the body portion or core 58. Rubber of the type generally used in automobile tires, fan belts or the like has been found to be highly satisfactory for this purpose. The outer skin 59 is preferably bonded to the body portion 58 and rotates therewith. Lugs 60 extend radially a short distance from the impervious skin 59 and are secured thereto. In the embodiment illustrated in FIGURE 3, the lugs 60 extend longitudinally of the cylindrically shaped doffer, but may define other patterns if desired. In a preferred embodiment, the skin 59 and the lugs 60 are molded of the same material at the same time to form an externally unitary doffer. To strengthen the doffer 55 in use, cords 62 are embedded in the rubber during the molding process in substantially the same manner as cords are used to strengthen automobile tires, fan belts or the like. To afford closer positioning of the doffer 55 relative to the saw with which it is associated, the lugs 60 may be slotted to interdigitate with the saw. Such interdigitation maximizes the contact of the lugs 60 with cotton carried by the saw in accordance with my invention. Doffers employed in accordance with my invention generally travel at relatively high speeds. Large sticks, limbs, rocks or the like would tend to break, bend or otherwise harmfully affect doffers travelling at such high speeds. This problem is substantially alleviated by use of the doffer 55 illustrated in FIGURES 3 and 4. When the lugs of the doffer encounter such an obstacle, they deform, along with the skin and body portion, to permit passage of the object and return to their functional shape without harmful effect when the obstacle has passed.

Figures 3, 4, 5:
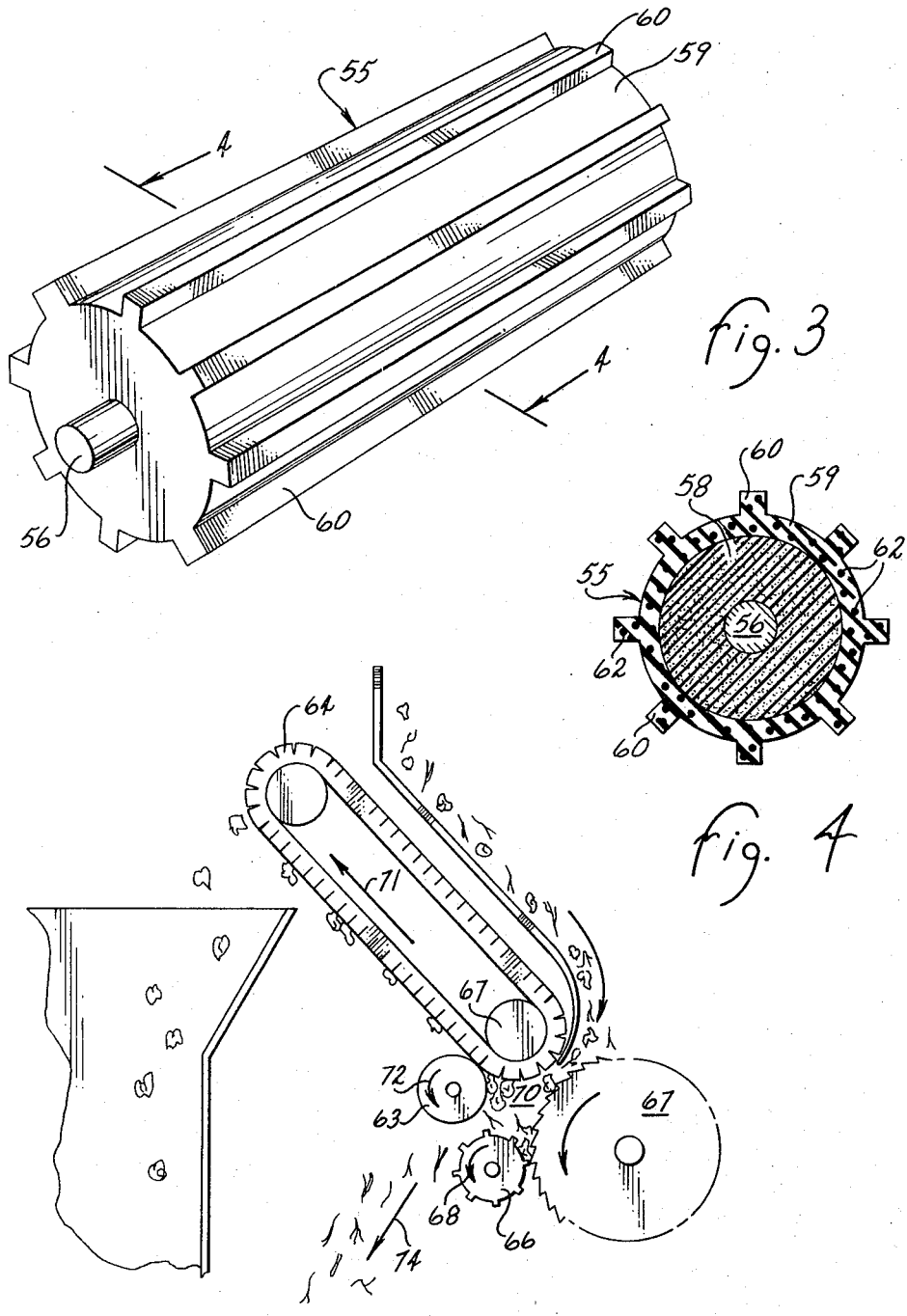
FIGURE 3 is an isometric view of a doffer of a new design which is particularly useful in cotton reclaiming apparatus in accordance with my invention.
FIGURE 4 is a sectional elevational view taken along 4—4 of FIGURE 3.
FIGURE 5 is a partial side elevational view illustrating another embodiment of my improved cotton reclaiming apparatus.

FIGURE 5 illustrates a further modification of my invention in which a roller 63 is employed to assist the belt 64 in grasping cotton thrown by the doffer 66. The relative positioning of the slotted belt 64, the doffer 66 and the saw 67 is substantially the same as hereinbefore described in connection with FIGURE 2. Relative motions of the aforementioned elements are also substantially the same as described in connection with FIGURE 2. Cotton and trash carried downwardly by saw 67 contacts the doffer 66 rotating in the direction shown by the arrow 68. Cotton is thrown by the doffer 68 into a reclaiming zone 70 where the slots in the slotted belt 64 are closing to grasp the cotton. The roller 63 is positioned close to or in contact with the belt 64 and has an axis of rotation parallel to that of the doffer 66. Roller 63 rotates in the direction shown by the arrow 72. If desired, rotary motion may be imparted to the roller 63 by power means other than the slotted belt 64. Positioning of the roller is such that its point of closest proximity to the slotted belt is in the area in which the slots in the belt 64 are closing as the belt 64 passes around the lowermost pulley 67. Any trash adhering to the cotton grasped by the belt will tend to be thrown off since inflexible trash will be forced by the roller to follow a tangential path away from the surface of the belt.

Trash thrown by the doffer 66 generally passes between the doffer and the roller in the direction indicated by the arrow 74. Trash which strikes the roller 63 will usually bounce downwardly and away from the doffer 66. The motion of the doffer 66 is such that trash which drops on it after contact with the roller 63 will be thrown away from the apparatus along with the rest of the trash. Thus, the roller assists in the operation of my apparatus by urging cotton thrown by the doffer 66 into grasping contact with the belt 64 and by dividing the cotton from the trash thrown by the doffer 66.

Roller 63 is generally constructed with a resiliently deformable inner cylindrical core and with a flexible, but substantially impervious, outer skin. In this manner, the roller may be employed in close proximity to the belt 64 and will permit cotton to pass therebetween while urging same into grasping contact with the belt. If desired, the operation of the roller may be further enhanced by slightly roughening its surface. In this manner, cotton which contacts the roller near the outer portion of the reclaiming zone 70 is urged back into the reclaiming zone by frictional engagement with the roller. Trash, being generally brittle, will not be significantly affected by the roughness of the roller surface and will be thrown into discard as set forth hereinbefore.

Various modifications may be made in my invention without departing from the spirit or scope thereof, and it is to be understood that I limit myself only as defined by the appended claims.

I claim:

1. A cotton reclaiming apparatus comprising in combination
   (a) a rotating saw for carrying cotton and trash substantially downwardly,
   (b) a doffer having an axis of rotation substantially parallel to the axis of rotation of said saw,
   (c) said doffer positioned proximate to the periphery of said saw and rotating in the same angular direction as said saw, and
   (d) a belt travelling about a plurality of pulleys,
   (e) said belt defining a plurality of slots which open when said belt passes over a pulley, and
   (f) said belt and pulleys positioned above said doffer,
   (g) whereby cotton thrown from said saw by said doffer is grasped and reclaimed by said slots.

2. A cotton reclaiming apparatus comprising in combination
   (a) a rotating cotton saw for carrying cotton and trash substantially downwardly,
   (b) a doffer comprising a plurality of radial lugs positioned proximate to the periphery of said saw,
   (c) said doffer having an axis of rotation substantially parallel to the axis of rotation of said saw,
   (d) said doffer rotating in the same angular direction as said saw to throw cotton and trash therefrom, and
   (e) a slotted belt travelling about a pair of pulleys,
   (f) said belt defining a plurality of transverse slots which open when said belt passes over a pulley,
   (g) said belt and pulleys positioned above said doffer,
   (h) the line between said pulleys inclined from the vertical away from said saw,
   (i) whereby cotton thrown from saw by said doffer is grasped and reclaimed by said slotted belt.

3. A cotton reclaiming apparatus comprising in combination
   (a) a rotating cotton cleaner saw for carrying cotton and trash substantially downwardly,
   (b) a doffer comprising a plurality of radial lugs positioned proximate to the periphery of said saw,
   (c) said doffer having an axis of rotation substantially parallel to the axis of rotation of said saw, and
   (d) a belt travelling about a pair of pulleys,
   (e) said belt defining a plurality of transverse slots which open when said belt passes over a pulley,
   (f) said belt and pulleys positioned above said doffer to form a cotton reclaiming zone therebetween,
   (g) the line between said pulleys inclined from the vertical away from said saw,
   (h) said doffer rotating in the same angular direction as said saw to throw cotton from said saw into said reclaiming zone,
   (i) said slots in said belt closing in said reclaiming zone,
   (j) whereby cotton thrown from said saw by said doffer is grasped by said slots and carried from said reclaiming zone.

4. A cotton reclaiming apparatus comprising in combination
   (a) a rotating saw for carrying cotton and trash substantially downwardly,
   (b) a doffer having an axis of rotation substantially parallel to the axis of rotation of said saw,
   (c) said doffer positioned proximate to the periphery of said saw and rotating in the same angular direction as said saw,
   (d) a belt travelling about a plurality of pulleys,
   (e) said belt defining a plurality of slots which open when said belt passes over a pulley,
   (f) said belt and pulleys positioned above said doffer, and
   (g) a roller positioned proximate to said belt for assisting said doffer in urging cotton into contact with said slotted belt,
   (h) said roller having an axis of rotation substantially parallel to the axis of said doffer,
   (i) whereby cotton thrown from said saw by said doffer is grasped and reclaimed by said slots.

5. A cotton reclaiming apparatus comprising in combination
   (a) a rotating cotton cleaner saw for carrying cotton and trash substantially downwardly,
   (b) a doffer comprising a plurality of radial lugs positioned proximate to the periphery of said saw,
   (c) said doffer having an axis of rotation substantially parallel to the axis of rotation of said saw,
   (d) a belt travelling about a pair of pulleys,
   (e) said belt defining a plurality of transverse slots which open when said belt passes over a pulley,
   (f) said belt and pulleys positioned above said doffer to form a cotton reclaiming zone therebetween,
   (g) the line between said pulleys inclined from the vertical away from said saw, and
   (h) a roller positioned proximate to said belt and forming a boundary for said reclaiming zone,
   (i) said roller rotating about an axis substantially parallel to the axis of rotation of said doffer,
   (j) said roller assisting said doffer in urging cotton into contact with said belt in said cotton reclaiming zone,
   (k) said doffer rotating in the same angular direction as said saw to throw cotton from said saw into said reclaiming zone, (l) said slots in said belt closing in said reclaiming zone, (m) whereby cotton thrown from said saw by said doffer is grasped by said slots and carried from said reclaiming zone.

6. The cotton reclaiming apparatus of claim 5 wherein said roller comprises a resiliently deformable cylindrical body portion having a flexible, substantially impervious skin.

No references cited.

MERVIN STEIN, *Primary Examiner.*

I. C. WADDEY, JR., *Assistant Examiner.*